(12) United States Patent
Bialer et al.

(10) Patent No.: US 12,339,396 B2
(45) Date of Patent: Jun. 24, 2025

(54) RADAR REFLECTION DETECTION WITH CONVOLUTIONAL NEURAL NETWORK KERNELS MATCHED TO REFLECTION-GHOST OFFSET

(71) Applicant: GM GLOBAL TECHNOLOGY OPERATIONS LLC, Detroit, MI (US)

(72) Inventors: Oded Bialer, Petah Tikva (IL); Yuval Haitman, Oranit (IL)

(73) Assignee: GM Global Technology Operations LLC, Detroit, MI (US)

( * ) Notice: Subject to any disclaimer, the term of this patent is extended or adjusted under 35 U.S.C. 154(b) by 390 days.

(21) Appl. No.: 18/098,874

(22) Filed: Jan. 19, 2023

(65) Prior Publication Data

US 2024/0248174 A1 Jul. 25, 2024

(51) Int. Cl.
*G01S 7/41* (2006.01)
(52) U.S. Cl.
CPC .............. *G01S 7/417* (2013.01); *G01S 7/412* (2013.01)

(58) Field of Classification Search
CPC .................................. G01S 7/417; G01S 7/412
See application file for complete search history.

(56) References Cited

U.S. PATENT DOCUMENTS

| 2022/0026557 A1* | 1/2022 | Arbabian .............. G01S 13/726 |
| 2022/0276375 A1* | 9/2022 | Armstrong-Crews ...................... G01S 13/42 |

\* cited by examiner

*Primary Examiner* — Vladimir Magloire
*Assistant Examiner* — Nazra Nur Waheed
(74) *Attorney, Agent, or Firm* — Quinn IP Law

(57) ABSTRACT

A method that includes obtaining reflective radar signals regarding a scene monitored by a radar sensor system having an antenna array that is characterized by effecting a reflection-ghost offset in one or more domains, determining a reflective-intensity (RI) spectrum in three domains based on the reflective radar signals, producing a filtered RI spectrum by applying a trained convolutional neural network (CNN) to the RI spectrum by, at least in part, filtering the RI spectrum using one or more CNN kernels that incorporate the reflection-ghost offset; and detecting objects in the monitored scene based, at least in part, on the filtered RI spectrum.

20 Claims, 5 Drawing Sheets

RADAR REFLECTION DETECTION WITH CONVOLUTIONAL NEURAL NETWORK KERNELS MATCHED TO REFLECTION-GHOST OFFSET

INTRODUCTION

This disclosure relates to techniques for radar reflection detection optimization for convolution neural networks.

Automotive radar is the most promising and fastest-growing civilian application of radar technology. Vehicular radars provide the key enabling technology for the autonomous driving revolution that has the potential to improve everyone's day-to-day lives. Automotive radars, along with other sensors such as lidar, (which stands for "light detection and ranging"), ultrasound, and cameras, form the backbone of self-driving cars and advanced driver assistant systems (ADASs). These technological advancements are enabled by extremely complex systems with a long signal processing path from radars/sensors to the controller. Automotive radar systems are responsible for the detection of objects and obstacles, their position, and speed relative to the vehicle.

SUMMARY

According to one embodiment, a method that facilitates object detection, the method includes obtaining reflective radar signals regarding a monitored scene, the reflective radar signals being received by an array of multiple antennas of a radar sensor system; determining a reflective-intensity (RI) spectrum based on the reflective radar signals, wherein the RI spectrum contains at least three domains of reflective intensity with respect to reflection points and the radar sensor system, the at least one of those domains of reflective intensity includes azimuth, and wherein the array of multiple antennas of the radar sensor system is characterized by effecting a reflection-ghost offset of reflective intensity in one or more of the domains; producing a filtered RI spectrum by applying a trained convolutional neural network (CNN) to the RI spectrum by, at least in part, filtering the RI spectrum using one or more CNN kernels that incorporate the reflection-ghost offset; and detecting objects in the monitored scene based, at least in part, on the filtered RI spectrum.

In this embodiment of the method, the one or more CNN filters that incorporate the reflection-ghost offset is characterized as a tensor of values containing a first emphasizing value configured to emphasize a main lobe of a spreading function in one or more domains of the RI spectrum and a second emphasizing value to emphasize a side lobe of the spreading function, wherein a spacing in the tensor of values between the first and second emphasizing values matches the reflection-ghost offset.

With this embodiment of the method, the determining of the RI spectrum includes digitizing the RI spectrum; and the producing of the filtered RI spectrum operates on the digitized RI spectrum.

With this embodiment, the reflection-ghost offset is an azimuth offset in the azimuth domain, which is an azimuth difference from a reflection point in the azimuth domain and its accompanying reflection ghost.

In this embodiment of the method, the CNN filter is applied to a reduced RI spectrum, the method further comprises reducing the RI spectrum to two domains of reflective intensity, wherein the two domains include the range and azimuth.

In this embodiment, the method further includes reporting detected objects to a perception system of a vehicle; and classifying the detected objects in the scene.

In this embodiment, the method further includes obtaining the reflection-ghost offset; setting a CNN kernel to the reflection-ghost offset; and supervised training an untrained CNN using a ground-truth RI spectrum with the CNN kernel with the reflection-ghost offset set therein.

Other embodiments include a device selected from a group consisting of a vehicle, an autonomous vehicle, a semi-autonomous vehicle, a video surveillance system, a medical imaging system, a video or image editing system, an object tracking system, a video or image search or retrieval system, and a weather forecasting system, the device is configured to perform the above-mentioned method.

According to yet another embodiment, an object detection system a radar sensor system with an array of multiple antennas, wherein the array of multiple antennas is characterized by effecting a reflection-ghost offset of reflective intensity of signals received thereby in one or more domains of a reflective-intensity (RI) spectrum; reflective-radar signal obtainer configured to obtain reflective radar signals regarding a scene monitored by the radar sensor system, the reflective radar signals being received by the array of multiple antennas; a RI spectrum determiner configured to determine a RI spectrum based on the reflective radar signals, wherein the RI spectrum contains at least three domains of reflective intensity with respect to reflection points and the radar sensor system, the at least one of those domains of reflective intensity includes azimuth; a convolutional neural network (CNN) applier configured to produce a filtered RI spectrum by applying a trained CNN to the RI spectrum by, at least in part, filtering the RI spectrum using one or more CNN kernels that incorporate the reflection-ghost offset, the one or more CNN filters that incorporate the reflection-ghost offset is characterized as a tensor of values containing a first emphasizing value configured to emphasize a main lobe of a spreading function in one or more domains of the RI spectrum and a second emphasizing value to emphasize a side lobe of the spreading function, wherein a spacing in the tensor of values between the first and second emphasizing values matches the reflection-ghost offset; and an object detector configured to detect objects in the monitored scene based, at least in part, on the filtered RI spectrum.

In this embodiment, the RI spectrum determiner is further configured to digitize the RI spectrum; and the CNN applier is further configured to operate on the digitized RI spectrum.

With this embodiment, the reflection-ghost offset is a range offset in the range domain, which is a range difference from a reflection point in the range domain and its accompanying reflection ghost.

In this embodiment of the system, another of the domains of the RI spectrum includes range, speed ("Doppler"), and elevation.

Another embodiment of the system also includes a reporter configured to report detected objects to a perception system, and a classifier configured to classify the detected objects in the scene.

Another embodiment of the system also includes an offset obtainer configured to obtain the reflection-ghost offset and set a CNN kernel to the reflection-ghost offset, and a trainer configured to provide supervised training of an untrained CNN using a ground-truth RI spectrum with the CNN kernel with the reflection-ghost offset set therein.

Other embodiments of the system include a device selected from a group consisting of a vehicle, an autonomous vehicle, a semi-autonomous vehicle, a video surveillance system, a medical imaging system, a video or image editing system, an object tracking system, a video or image search or retrieval system, and a weather forecasting system.

According to yet another embodiment, a non-transitory machine-readable storage medium encoded with instructions executable by one or more processors that, when executed, direct one or more processors to perform operations that facilitate object detection. These operations include obtaining reflective radar signals regarding a monitored scene, the reflective radar signals being received by an array of multiple antennas of a radar sensor system; determining a reflective-intensity (RI) spectrum based on the reflective radar signals, wherein the RI spectrum contains at least three domains of reflective intensity with respect to reflection points and the radar sensor system, the three domains of reflective intensity include range, speed ("Doppler"), and azimuth, and wherein the array of multiple antennas of the radar sensor system is characterized by effecting a reflection-ghost offset of reflective intensity in one or more of the domains; producing a filtered RI spectrum by applying a trained convolutional neural network (CNN) to the RI spectrum by, at least in part, filtering the RI spectrum using one or more CNN kernels that incorporate the reflection-ghost offset; and detecting objects in the monitored scene based, at least in part, on the filtered RI spectrum.

The non-transitory machine-readable storage medium embodiment in which the one or more CNN filters that incorporate the reflection-ghost offset is characterized as a tensor of values containing a first emphasizing value configured to emphasize a main lobe of a spreading function in one or more domains of the RI spectrum and a second emphasizing value to emphasize a side lobe of the spreading function, wherein a spacing in the tensor of values between the first and second emphasizing values matches the reflection-ghost offset.

In the non-transitory machine-readable storage medium embodiment in which the CNN filter is applied to a reduced RI spectrum, the method further comprises reducing the RI spectrum to two domains of reflective intensity, wherein the two domains include the range and azimuth.

The non-transitory machine-readable storage medium embodiment in which the operations further include obtaining the reflection-ghost offset; setting a CNN kernel to the reflection-ghost offset; and supervised training an untrained CNN using a ground-truth RI spectrum with the CNN kernel with the reflection-ghost offset set therein.

The above features and advantages, and other features and advantages of the present teachings are readily apparent from the following detailed description of some of the best modes and other embodiments for carrying out the present teachings, as defined in the appended claims when taken in connection with the accompanying drawings.

DETAILED DESCRIPTION

Figure 1:
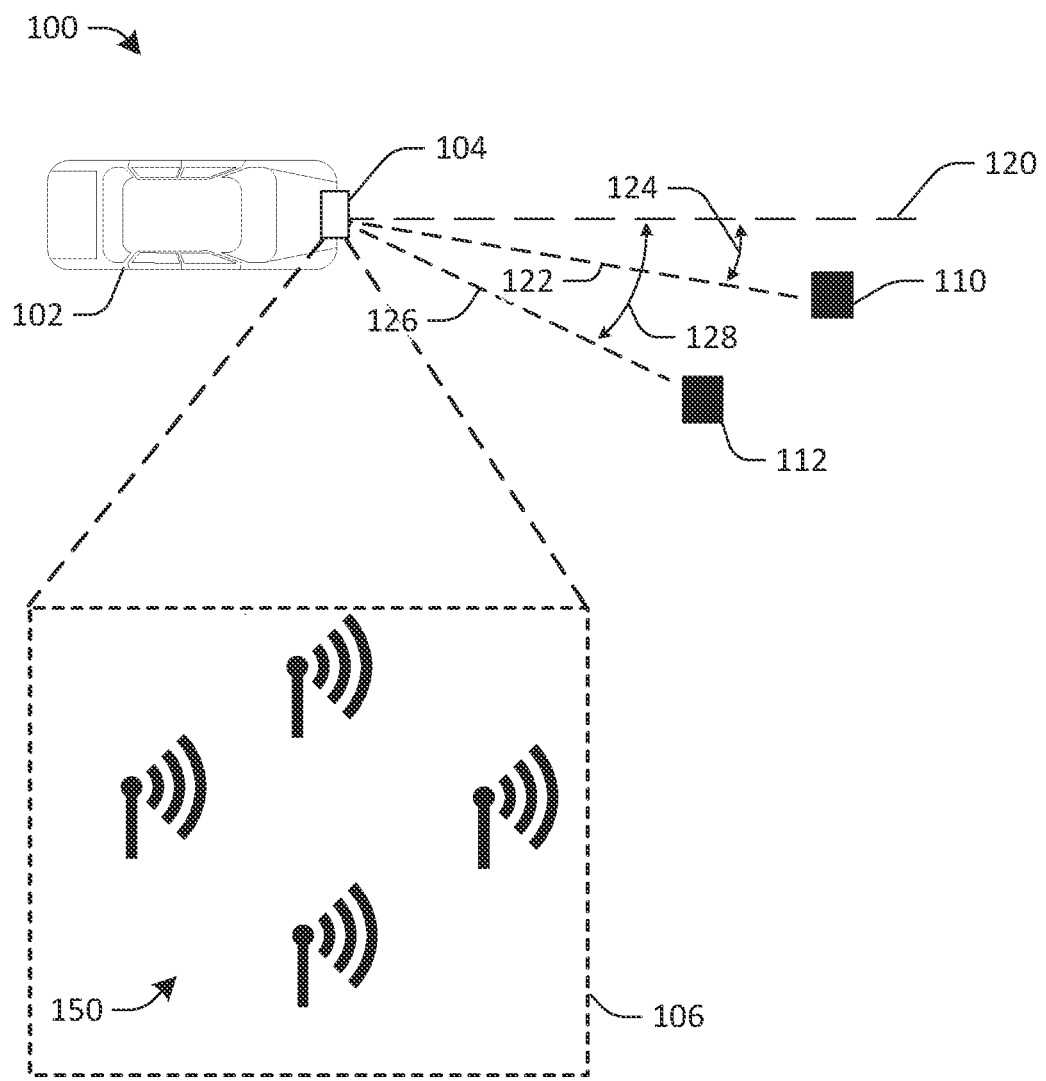
FIG. 1 illustrates an example scenario of a radar sensor system receiving reflective radar signals from two reflection points in a monitored scene, in accordance with one or more implementations described herein.

The technology described herein facilitates object detection by employing kernels of a convolutional neural network (CNN) system that match a reflection-ghost offset (e.g., azimuth offset) of an array of multiple antennas of a radar sensor system.

Referring now to the drawings, wherein like numerals indicate like parts in the several views of various systems and approaches are shown and described herein. Disclosed approaches may be suitable for object detection for automotive vehicles, such as for autonomous or semi-autonomous driving.

The present disclosure may be described with respect to an example vehicle 102, which is described in more detail herein with respect to FIG. 1. Although the present disclosure primarily provides examples using automobiles, other types of devices may be used to implement those various approaches described herein, such as robots, camera systems, weather forecasting devices, medical imaging devices, etc. In addition, these approaches may be used for controlling autonomous or semi-autonomous vehicles, or for other purposes, such as, without limitation, video surveillance, video or image editing, video or image search or retrieval, object tracking, weather forecasting, and/or medical imaging (e.g., using ultrasound or magnetic resonance imaging (MRI) data).

Vehicles often perform radar-based object detection, which uses a vehicle-based radar sensor system to detect objects and measure their distance, speed, and other characteristics. Radar sensors transmit electromagnetic waves and then detect the reflected waves that bounce back from objects in their field of view (i.e., scene). By analyzing the properties of the reflected waves, radar sensors can infer the presence, location, and movement of objects in the environment.

Radar-based object detection is used in a wide range of applications, including autonomous vehicles, aviation, and industrial automation. It has several advantages over other types of object detection technologies, such as the ability to operate in poor visibility conditions (e.g., fog, rain, snow) and to detect objects that are not visible to cameras (e.g., behind walls or around corners).

There are several different types of radar-based object detection systems, including continuous-wave radar, frequency-modulated continuous-wave radar, and pulsed radar. Each type has its own set of characteristics and applications. For example, continuous-wave radar is often used for long-range detection, while pulsed radar is more suitable for short-range detection with high resolution.

Using radar-based object detection, vehicles can detect and avoid nearby cars, obstacles, and other objects. Automotive radar systems typically include a radar sensor system, that includes a transmitter and receiver. The transmitter sends out radio waves that hit an object and bounce back to the receiver. This bounce back is called a reflection. The radar system determines the properties of a reflection to help determine an object's location and speed relative to the vehicle.

More particularly, the radar system may create a reflective-intensity (RI) spectrum, which may be called a reflective intensity image (RII) in two dimensions or reflective intensity volume (RIV) in three dimensions (or perhaps more dimensions). The RIV maps out the reflection intensity across three domains (i.e., dimensions) of the measured or calculated properties of the received reflections: range, speed ("Doppler"), and azimuth. Thus, the RIV may be considered a three-dimensional cube of reflection intensity data in the categories of range, Doppler, and azimuth.

In some instances, the RIV may map out the reflection intensity in more than three domains of measured or calculated properties of the received reflections. Some of those domains include range, Doppler, azimuth, and elevation.

The range reflective-intensity domain indicates a distance with respect to reflection points and the radar sensor system. That is, based on reflective intensity, the range domain indicates distances between reflection points and the radar sensor system. The reflection point is a candidate to be a detected object. The range is the one-dimensional linear distance between the radar sensor system and reflection points.

The Doppler reflective-intensity domain indicates a radial velocity (i.e., speed) of reflection points with respect to the radar sensor system. That is, based on reflective intensity, the Doppler domain indicates the radial velocity of reflection points with respect to the radar sensor system. The radial velocity is the velocity of a reflection point (i.e., candidate object) along the line of sight from the observer (i.e., the radar sensor system) to the reflection point. The radial velocity is determined utilizing the familiar Doppler effect or shift. That is, the change in the received signal frequency due to the movement of the reflected object relative to the radar sensor system.

The azimuth reflective-intensity domain indicates an angular distance with respect to reflection points and the radar sensor system. That is, the azimuth domain indicates the reflective intensity of reflection points at various azimuths (i.e., angles) from the radar sensor system. The azimuth is the one-dimensional angular distance between the radar sensor system and reflection points.

FIG. 1 illustrates an example scenario 100 that illustrates the capture of the azimuth domain of the RI spectrum from the radar signals reflected from a scene being radar monitored. The example scenario 100 includes vehicle 102, which is an automobile with a radar sensor system 104 for object detection purposes. In this example scenario 100, there are two reflection points: Point A 110 and point B 112. These reflection points indicate a potential object in the monitored scene of the radar sensor system 104. The scene is the area or volume scanned by the radar sensor system 104. In this scenario 100, the monitored scene is approximate +/− forty degrees directly in front of vehicle 102.

Radar sensor system 104 includes an antenna array 106 of multiple antennas, which transmit and/or receive over multiple different channels. The different transmit channels are used to drive different antennas. These multiple transmit channels also provide beamsteering capabilities. As depicted, antenna array 106 includes multiple receive antennas 150, which are configured to receive multiple receive channels. The multiple receive channels give the angular information about the object as there is a phase difference between signals received by different receive antennas.

Dashed line 120 indicates the baseline or zero-degree line for the radar sensor system 104. Dashed line 122 is the straight line from the radar sensor system 104 and Point A 110. The angle between dashed lines 120 and 122 is an azimuth 124, which may be called theta 1 ($\theta_1$) of Point A. That is, the angle measurement between the radar sensor system 104 and Point A 110 is the azimuth theta 1 ($\theta_1$).

Similarly, dashed line 126 is the straight line from the radar sensor system 104 and Point B 112. The angle between dashed lines 120 and 126 is an azimuth 128, which may be called theta 2 ($\theta_2$) of Point B. That is, the angle measurement between the radar sensor system 104 and Point B 112 is the azimuth theta 2 ($\theta_2$).

Figure 2:
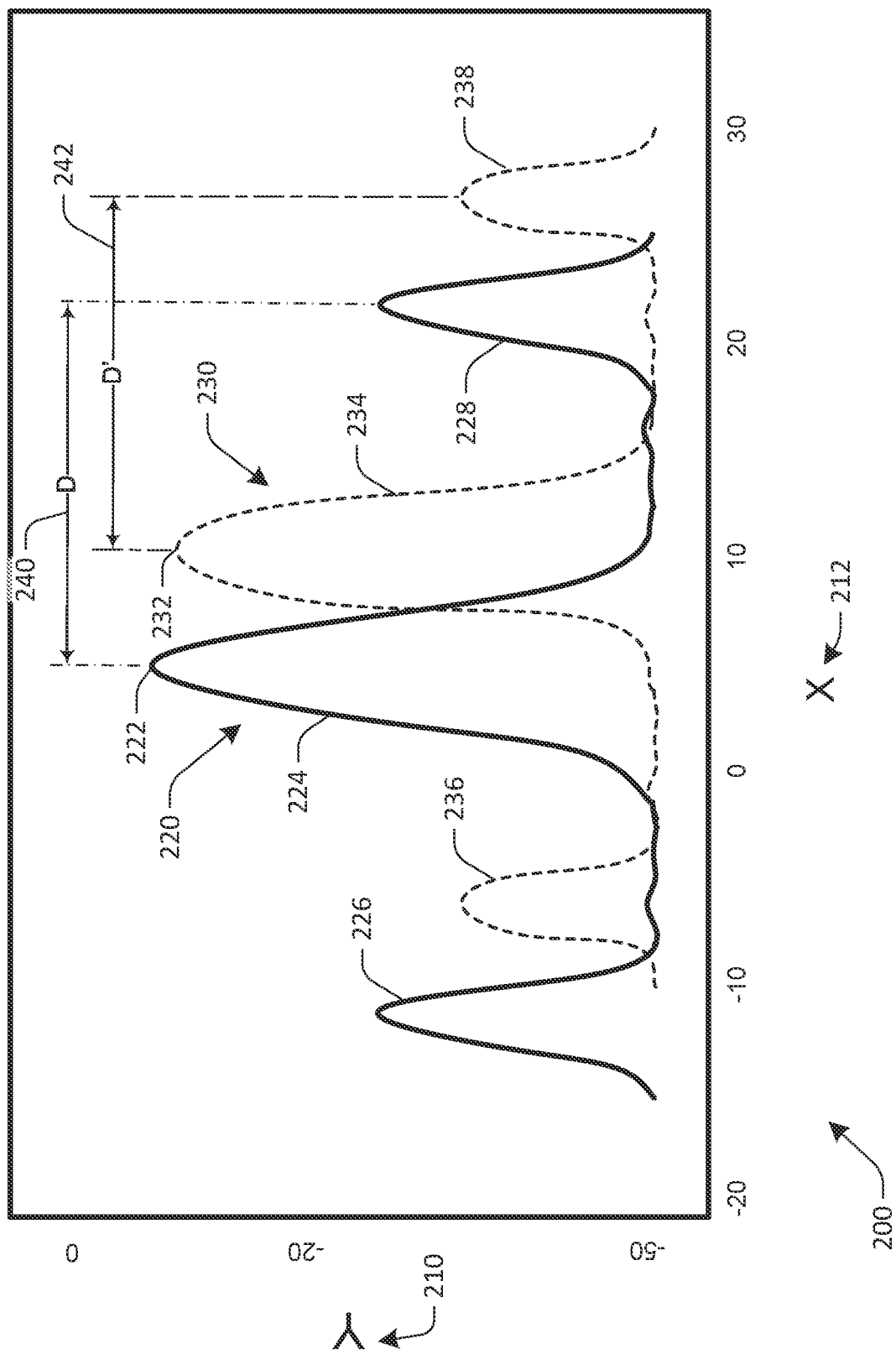
FIG. 2 shows a reflection-intensity-azimuth chart that illustrates the reflection points depicted in the azimuth domain with their accompanying reflection-ghost offset, in accordance with one or more implementations described herein.

FIG. 2 shows an example reflection-intensity-azimuth chart that illustrates the reflection points depicted in the azimuth domain with their accompanying reflection-ghost offset. A reflection-intensity-azimuth chart 200 is depicted with a Y-axis 210 representing the reflection intensity and an X-axis 212 representing the azimuth of that reflected intensity. This chart simply depicts a portion of the RI spectrum, namely the azimuth domain. The Doppler and range domains of the RI spectrum are not shown in chart 200.

Chart 200 shows two spreading functions. A first spreading function 220 is shown in a solid line and includes a reflection peak 222 of point A 110, which is at approximately five degrees azimuth angle. The reflection peak 222 indicates a candidate object at approximately five degrees from the baseline 120 of the radar sensor system 104. The first spreading function 220 includes a central main lobe 224 (which has peak 222) and a symmetrical companion pair of side lobes 226, and 228 on either side of the main lobe.

Similarly, a second spreading function 230 is shown in a dashed line and includes a reflection peak 232 of point B 112, which is at approximately eleven degrees azimuth angle. The reflection peak 232 indicates a candidate object at approximately eleven degrees from the baseline 120 of the radar sensor system 104. The second spreading function 230 includes a central main lobe 234 (which has peak 232) and a symmetrical companion pair of side lobes 236, and 238 on either side of the main lobe.

While each spreading function is shown here with only one pair of side lobes, spreading functions often have multiple pairs of side lobes. That is, a spreading function may have a multiple side lobe cascading away from the main lobe in one or both directions. Herein, each matching pair of side lobes has its ripple level as it cascades away from the main lobe. Thus, the closest matching pair to the main lobe is ripple level one. The next pair therefrom the main lobe is ripple level two and so forth. For example, the side lobes 226, and 228 of main lobe 224 are ripple level one. Likewise, the side lobes 236, and 238 of main lobe 234 are also ripple level one. No ripple level above one is depicted in chart 200.

Also, depending upon many circumstances (e.g., interference or overlapping reflections), a side lobe of a spreading function might not have an apparent pairing.

A spreading function is a mathematical function that describes the behavior of a radar signal as it propagates through the environment. It considers factors such as the reflection and scattering of the signal by the environment, as well as the absorption and emission of the signal by the target. The spreading function is used to model the interactions between the radar signal and the environment, and to predict the strength and characteristics of the reflected signal.

The side lobes of a spreading function of reflective intensities shown in Chart 200 are artifacts of the real reflection peak and do not represent actual reflections. That is, they are false or ghost reflections. For example, side lobes 226, and 228 are artifacts of the real reflection of point A 110, which is represented at peak 222 of the main lobe 224. Herein, these side lobes may be called "artifacts," "relics," or "ghosts."

The phenomenon that produces these ghosts may be called "blurring," "spreading function," or a "point spread function" (PSF) herein. The PSF may describe the response of a focused imaging system to a point source or point object. The PSF may be thought of as an impulse response of the radar sensor system. The PSF in many contexts can be considered the extended blob or blurring in an image that represents a single point object, considered a spatial impulse. It is a useful concept in Fourier optics, astronomical imaging, radar, medical imaging, electron microscopy, and other imaging techniques such as microscopy and fluorescence microscopy.

The degree of "blurring" of the reflective intensity PSF of signals received by a particular radar sensor system may be determined based, in part, on the arrangement of the receiving antennas in its array. Those of ordinary skill in the art are aware of how to determine the degree of "blurring" of the reflective intensity PSF of signals received by a particular radar sensor system based, in part, on the arrangement of the receiving antennas in its array.

The degree of "blurring" of the PSF is represented by a reflection-ghost offset in one or more of the domains of the RI spectrum. The reflection-ghost offset is set to the domain distance that each ripple level of side lobes is offset from its accompanying main lobe of the PSF that results from the particular arrangement of the multiple antennas in the array. That is, all side lobes of the same ripple level have the same reflection-ghost offset. This is to say, that different ripple levels of side lobes have differing reflection-ghost offsets.

For example, the antenna array 106 of the radar sensor system 104 is characterized as having a reflection-ghost offset in the azimuth domain called the azimuth offset herein. As shown in chart 200, the azimuth offset is a distance D 240. That is, the distance D 240 is the angular distance between the main lobe 224 of the spreading function 220 and its side lobe 228. As depicted, the side lobes 226, and 228 are pairs are at ripple level one of the main lobe 224. Thus, the angular distance between the main lobe 224 of the spreading function 220 and its side lobe 226 is also the same angular offset, which is the distance D.

Likewise, since the reflection-ghost offset of each ripple level is an emergent deterministic property of the particular radar sensor system, the reflection-ghost offset applies to the ripple levels of the spreading functions of each reflection peak. For example, as shown in chart 200, the angular distance between the main lobe 234 of the spreading function 230 and its ripple-level-one side lobe 238 and/or side lobe 236 is the angular distance D' 242. Since offsets are for ripple level one side lobes, the distance D 240 and the distance D' 242 are the same angular distance.

Convolutional neural networks (CNNs) are a type of artificial intelligence (AI) neural network that is particularly well-suited for image recognition tasks. CNNs use a mathematical operation called convolution in place of general matrix multiplication in at least one of their layers. They are able to process and analyze large amounts of visual data, extracting features and patterns that can be used to classify or identify objects in an image.

In the context of radar-based object detection, CNNs may be used to analyze radar data in order to identify and classify objects in the environment. Radar data consists of echoes of electromagnetic waves that have been reflected off of objects in the environment. These echoes can be used to construct an image of the environment, similar to how an optical camera constructs an image using light.

CNNs can be trained to recognize and classify objects in these radar images by being fed a large dataset of labeled radar images. The CNN learns to identify the features and patterns in the radar data that are associated with different types of objects and can then use this knowledge to classify new radar images.

The convolution of a CNN employs a kernel (i.e., filter) to extract certain features from the input. In short, in some instances, a CNN kernel is a matrix of weights that are multiplied with the input to extract relevant features. The kernel is slid across the image and multiplied with the input to enhance the output in a certain desirable manner.

More generally, a CNN kernel may be a tensor, which may be represented as a multidimensional array. Tensors are mathematical objects that can be used to describe physical properties, just like scalars and vectors. In fact, tensors are a generalization of scalars and vectors; a scalar is a zero-rank tensor, and a vector is a first-rank tensor.

CNN kernels are typically employed to detect local feature patterns in the input especially those that are spatially invariant in the input's domains. For example, if the input is a two-dimensional image of pixels, then the local features involve those that are determined by nearby neighboring pixels. Presume, for this example, that the CNN kernel is a ten-pixel-wide square. The weights in the matrix of the CNN kernel are called coefficients. Local features are determined based on input within the ten-pixel-wide square of data.

CNNs use relatively little pre-processing compared to other image classification approaches. This means that the CNN learns to optimize its filters (i.e., kernels) through automated learning of the weights in the kernel. In traditional AI approaches, these filters are hand-engineered.

Figure 3:
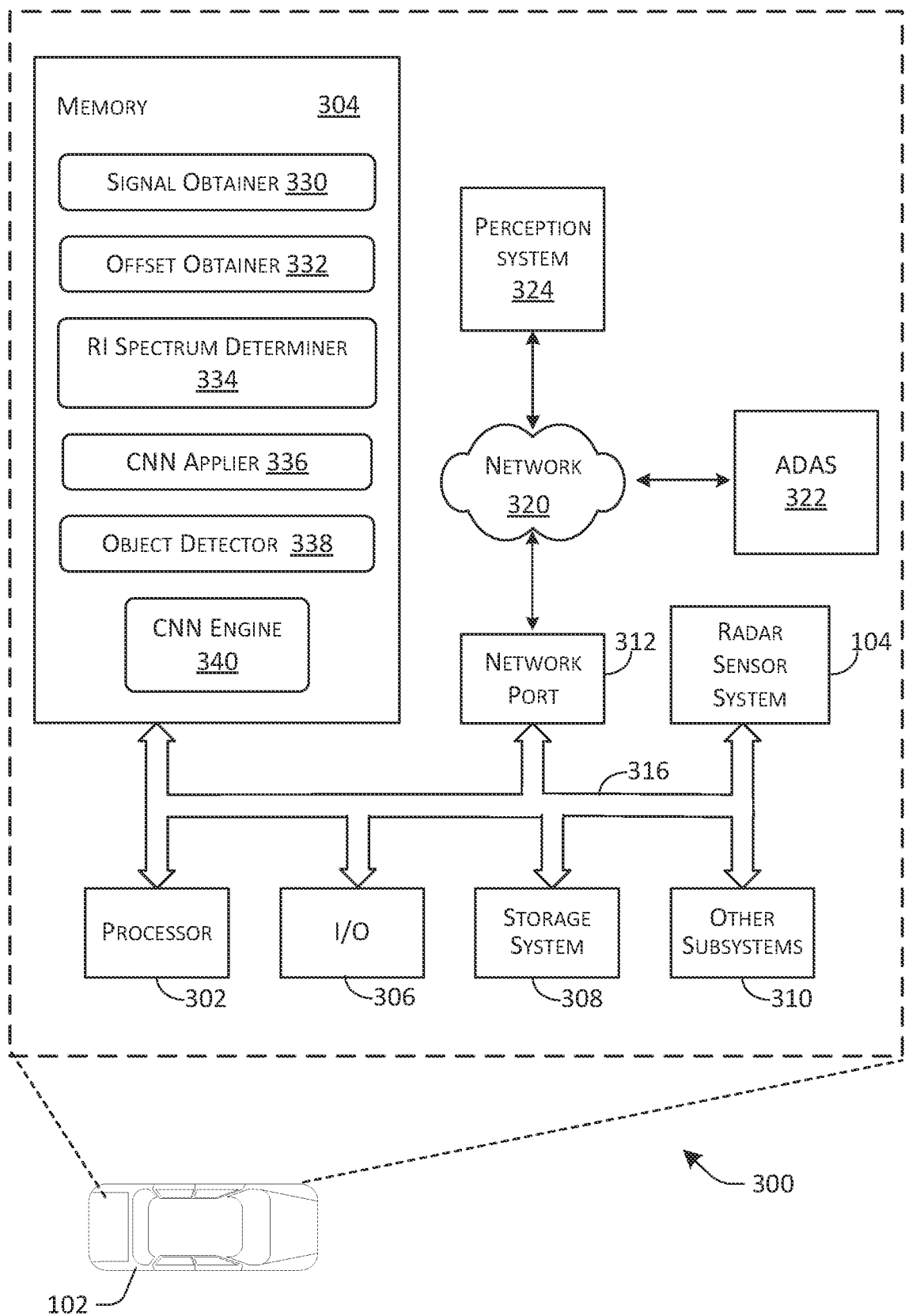
FIG. 3 illustrates an example of computer architecture for a computing system capable of executing the technology described herein.

FIG. 3 illustrates an example of computer architecture for a computing system 300 capable of executing the technology described herein. The computer architecture shown in this figure illustrates a typical computer, server computer, workstation, desktop computer, laptop, tablet, network appliance, e-reader, smartphone, or another computing device. The computer system 300 may be part of vehicle 102 and can be utilized to execute the functionalities presented herein.

The computing system 300 includes a processor 302 (e.g., central processor unit or "CPU"), system storage (e.g., memory) 304, input/output (I/O) devices 306—such as a display, a keyboard, a mouse, and associated controllers, a secondary storage system 308 (e.g., a hard drive), and various other subsystems 310. In various embodiments, the computing system 300 also includes network port 312 operable to connect to a network 320, which is likewise accessible by an advanced driver assistant system (ADAS) 322 and perception system 324. The computing system 300 may include or be connected to the radar sensor system 104. The foregoing components may be interconnected via one or more buses 316 and/or network 320.

Referring back to FIG. 1, the radar sensor system 104 includes the antenna array 106 of multiple antennas, which transmit and/or receive over multiple different channels. The different transmit channels are used to drive different antennas. These multiple transmit channels also provide beam-steering capabilities. As depicted in FIG. 1, antenna array 106 includes multiple receive antennas 150, which are configured to receive multiple receive channels. The multiple receive channels give the angular information about the object as there is a phase difference between signals received by different receive antennas.

The radar sensor system 104 receives the reflected signals to help determine objects' locations and speed relative to vehicle 102. The radar sensor system 104 monitors the area or volume around vehicle 102. Herein, unless the context indicates otherwise, that monitored area or volume is called a scene. For example, as shown in FIG. 1, the scene is the area or volume proximate to the forward direction of vehicle 102.

The antenna array 106 of the radar sensor system 104 is characterized by effecting a reflection-ghost offset of reflective intensity in one or more of the domains. For example, the antenna array 106 may be characterized as having a reflection-ghost offset in the azimuth domain, which is called the azimuth offset herein. The azimuth offset is an angular distance between a main lobe of a spreading function and each ripple of its side lobes. Since the reflection-ghost offset of each ripple level is an emergent deterministic property of the particular radar sensor system, the reflection-ghost offset applies to the ripple levels of the spreading functions of each reflection peak.

Returning to FIG. 3, the ADAS 322 may be configured to assist drivers of vehicle 102 in driving or parking functions. In some instances, the ADAS 322 may enable various levels of autonomous driving. Some of the functions that the ADAS 322 may enable or enhance include, for example, adaptive cruise control, automatic parking, autonomous valet parking, navigation, blind spot monitoring, automatic emergency braking, etc. The ADAS 322 may use the object detection results from the object detector module 338 and/or classification from the perception system 324 to perform or assist in the performance of its functionalities.

The perception system 324 may be configured to perform object detection, segmentation, and/or classification. In some instances, the perception system 324 may use the object detection results from the object detector module 338 to indicate a presence of a relevant item that is proximate to vehicle 102 and/or a classification of the item as an item type (e.g., cyclist, animal, car, pedestrian, building, tree, road surface, curb, sidewalk, unknown, etc.). Additionally, or alternatively, the perception system 324 may indicate one or more characteristics associated with a detected item and/or the environment in which the item is positioned. For example, the characteristics associated with an item may include, but are not limited to, an x-position, a y-position, a z-position, an orientation (e.g., a roll, pitch, yaw), an item type (e.g., a classification), a velocity of the item, an acceleration of the item, an extent of the item (size), etc. Characteristics associated with the environment may include but are not limited to, the presence of another item in the environment, a state of another item in the environment, a time of day, a day of a week, a season, a weather condition, an indication of darkness/light, etc.

System memory 304 may store data and machine-readable instructions (e.g., computer-readable instructions). The computing system 300 may be configured by machine-readable instructions. Machine-readable instructions may include one or more instruction modules. The instruction modules may include computer program modules. The instruction modules may include one or more of a signal obtainer module 330, an offset obtainer 332, a reflective-intensity (RI) spectrum determiner module 334, a CNN applier module 336, an object detector module 338, a CNN engine 340, and/or other instruction-based modules.

The signal obtainer module 330 may be configured to obtain reflective radar signals regarding a scene monitored by the array 106 multiple antennas of the radar sensor system 104. In some implementations, the radar sensor system 104 transmits a sequence of short waveforms. For example, each waveform may be a chirp signal with a duration of one-hundred milliseconds (100 ms) and there may be one hundred twenty-eight of these waveforms that are transmitted consecutively in one radar frame in which the RI spectrum is determined.

The offset obtainer 332 obtains the reflection-ghost offset that is associated with the antenna array 106 of the radar sensor system 104 for the purpose of training a CNN model. The reflection-ghost offset may be one or more domains (e.g., a combination of range, Doppler, azimuth, elevation). In some instances, the reflection-ghost offset may be an azimuth offset in the azimuth domain, which is an azimuth difference from a reflection point in the azimuth domain and its accompanying reflection ghost. In other instances, the reflection-ghost offset may be a range offset in the range domain, which is a range difference from a reflection point in the range domain and its accompanying reflection ghost. In still other instances, the reflection-ghost offset may include both the azimuth and range offsets.

Those of ordinary skill in the art are aware of how to determine the reflection-ghost offset of the reflective intensity PSF of signals received by a particular radar sensor system based, in part, on the arrangement of the receiving antennas in its array. This determination of the reflection-ghost offset may be made a priori to the offset obtainer 332 obtaining it.

This reflection-ghost offset may be stored in local memory (e.g., memory 304 or accessed via a network connection (e.g., via network 320). Using a radar identification code of the particular antenna array or the radar sensor system, the offset obtainer 332 may, for example, access an appropriate database of reflection-ghost offsets based its associated radar identification code.

The RI spectrum determiner module 334 may be configured to produce the RI spectrum based on the reflective radar signals obtained by the signal obtainer module 330. The determined RI spectrum indicates the reflection intensity of the reflected radar signals of a monitored scene across the range, the Doppler, and the azimuth domains. In addition, the determined RI spectrum may include information about the signals received by several of the multiple antennas of the antenna array 106 of the radar sensor system 104, the relative position of those antennas, and the wavelength of the radar signal.

In some instances, the RI spectrum determiner module 334 may be configured to determine a two-dimensional range-Doppler transform that incorporates (i.e., produces) the range RI spectrum and Doppler RI spectrum. In some implementations, the RI spectrum determiner module 334 may make this determination by transforming the range RI spectrum by the reflective radar signals, wherein the range RI spectrum includes range bins based on the reflective radar signals by multiple antennas of the radar sensor system. In some instances, the RI spectrum determiner module 334 may apply a fast Fourier transform (FFT) per each short-duration waveform (e.g., per each chirp signal) and per each antenna of the multiple antennas. The result includes range bins per antenna and per each short-duration waveform (e.g., 100 ms).

In some implementations, the RI spectrum determiner module 334 may make this determination by transforming the Doppler RI spectrum by the reflective radar signals, wherein the Doppler RI spectrum includes Doppler bins based on the range bins and the reflective radar signals by multiple antennas of the radar sensor system. In some instances, the RI spectrum determiner module 334 may apply a second FFT per range bin and each antenna. That is, the FFT is applied per each range bin and antenna. Thus, this results in a sequence of bins along the waveforms sequence (for example, one-hundred twenty-eight sequences). The RI spectrum determiner module 334 may apply the FFT to this sequence to obtain the Doppler bins of each range bin.

In some implementations, the RI spectrum determiner module 334 may perform at two-dimensional FFT over a short duration of waveforms and a long duration of waveforms. In this respect, the RI spectrum determiner module 334 produces these two-dimensional FFT processes in the range-Doppler reflection intensity domains of each antenna.

In other instances, the RI spectrum determiner module 334 reduces the RI spectrum to two domains of reflective intensity, such as the range and azimuth domain. Thus, the RI spectrum determiner module 334 produces two-dimensional FFT processes in the range-azimuth reflection intensity domains.

The CNN applier module 336 may be configured to apply a trained CNN model of the CNN engine 340 on the RI spectrum. More particularly, the CNN applier module 336 may produce a filtered RI spectrum by applying a trained CNN to the RI spectrum by, at least in part, filtering the RI spectrum using one or more CNN kernels that incorporate the reflection-ghost offset. For example, the incorporation of the reflection-ghost offset with the CNN kernel includes setting the pattern of weights of a matrix of the CNN kernel to the domain distance of the reflection-ghost offset. The reflection-ghost offset is the domain (e.g., azimuth) distance between the main lobe weights in the matrix and each ripple of the side lobes. In this way, the CNN kernel can detect features (e.g., the side lobes) that may be widely spaced rather than local.

In some instances, the RI spectrum may be pixelated (i.e., sampled or digitized). In such instances, the CNN kernel is also pixelated. The values (i.e., weights) of each pixel (or voxel, or the like) of the matrix of the CNN kernel are called coefficients, herein. The coefficients of the CNN kernel incorporate the reflection-ghost offset. Thus, the width of the matrix of the CNN kernel is sufficient to capture at least one ripple of the reflection ghost. Thus, it is at least one reflection-ghost offset wide (possibly in both directions from the main lobe of the spreading function).

In one or more instances, the training of the CNN kernel produces a matrix with a central and enhancing coefficient for the main lobe of the spreading function and side and de-emphasizing coefficients with a spacing from the central coefficient in the matrix that matches the ghost-reflection offset.

For example, the matrix of the CNN kernel is a hundred pixels wide. A central (herein, first) coefficient of the central pixel (or voxel or the like) of the matrix is some positive coefficient in order to emphasize the main lobe. In this example, the ghost-reflection offset is an angular distance of thirty-five pixels. Thus, at about thirty-five pixels on either side of the central coefficient in the matrix are a side (herein, second) coefficient where the reflection ghosts are anticipated. The side coefficient also emphasizes the reflection ghosts so that they are unlikely to cause false detection. The coefficients between the first and second coefficients are zero or otherwise negligible.

In some instances, the filtering of the RI spectrum by the CNN applier module 336 includes using one or more CNN kernels that incorporate the azimuth offset, the range offset, both offsets, or another reflection-ghost offset in another domain.

The object detector module 338 may be configured to analyze the object detection candidates produced by the CNN applier module 336 to report on detected objects to, for example, the perception system 324 of vehicle 102. In addition, the object detector module 338 may be configured to classify the detected objects in the scene. The object detector module 338 may classify detected objects into an item type, such as a cyclist, animal, car, pedestrian, building, tree, road surface, curb, sidewalk, unknown, and the like. In some instances, the perception system 324 may perform or assist in the performance of object classification.

The CNN engine 340 includes the trained CNN model that is applied by the CNN applier module 336. Herein, the CNN engine 340 may be employed to do supervised training. The CNN engine 340 iteratively trains the CNN model to detect objects using the techniques described herein with detection learning/improvement being based on ground truth high-resolution reflection maps (which include a ground-truth RI spectrum). The ground truth map is a labeled dataset with the targets for training and validating the model of the CNN engine 340.

CNN engine 340 may generate a trained CNN model by performing supervised training CNN model using a ground-truth RI spectrum. In this iterative training, the CNN kernel is set to the reflection-ghost offset. That is, the initial weights of the kernel as assigned based on the expected reflection-ghost offset of the relevant domain. The setting of CNN kernels produces CNN kernels that are matched to the reflection-ghost offset.

The CNN engine 340 may set one or more CNN kernels to the reflection-ghost offsets obtained by the offset obtainer 332. As noted herein, a CNN kernel is a tensor (e.g., a matrix) of weights that are multiplied with the input to extract relevant features. The kernel is slid across the input and multiplied with the input such that the output is enhanced or abated in a certain desirable manner. That desired manner is the pattern of weights in the matrix of the CNN kernel.

Herein, the weights in the tensor of the CNN kernel are initially set to emphasize (e.g., positive or negative weights) the main lobe and the side lobes. The domain (e.g., azimuth) distance between the main lobe weights in the tensor and each ripple of the side lobes is the obtained reflection-ghost offset. Since this domain distance is an emergent characteristic of the antenna array, the relative locations of the side lobes are predictable and do not change with each iteration of the supervised training of the CNN model. Instead, the iterative training adjusts the weights in the tensor to better match and identify the main and side lobes of a spreading function.

Herein, the setting of a CNN kernel to the reflection-ghost offset includes setting the initial weights and pattern of weights of the tensor to the reflection-ghost offset, which is the domain (e.g., azimuth) distance between the main lobe weights in the tensor and each ripple of the side lobes. In this way, the CNN kernel can detect features (e.g., the side lobes) that may be widely spaced rather than local. The setting of CNN kernels produces CNN kernels that are matched to the reflection-ghost offset.

In one or more instances, the training of the CNN kernel produces a tensor with a central and enhancing coefficient for the main lobe of the spreading function and side and de-emphasizing coefficients with a spacing from the central coefficient in the tensor that matches the ghost-reflection offset.

For example, the tensor of the CNN kernel is a hundred pixels wide. A central coefficient of the central pixel of the tensor is a first coefficient in order to emphasize the main lobe. In this example, the ghost-reflection offset is an angular distance of thirty-five pixels. Thus, at about thirty-five pixels on either side of the central coefficient in the tensor are a second coefficient where the reflection ghosts are anticipated. The second coefficient also emphasizes the reflection ghosts so that they are unlikely to cause false detection. The coefficients between the first and second coefficients are zero or otherwise negligible.

Note that more than one CNN kernel may be trained. Also, each kernel may be set to more than one reflection-ghost offset. As mentioned above, each reflection-ghost offset is matched to a ripple of side lobes. Thus, for a kernel to detect multiple ripples, the kernel may be set to a reflection-ghost offset per ripple.

Figure 4:
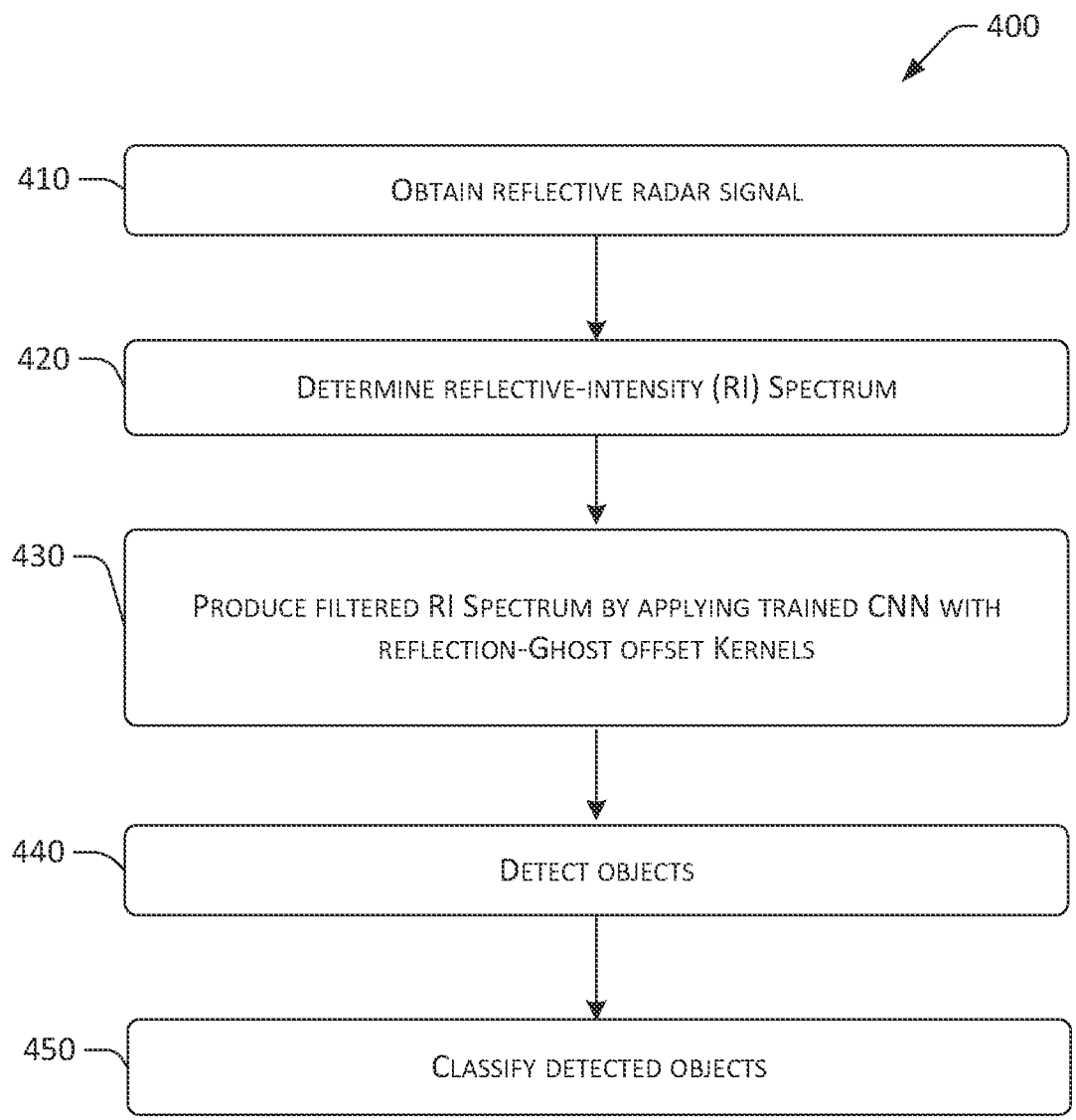
FIG. 4 is a flowchart illustrating a process to perform an example method of object detection, in accordance with one or more implementations described herein.

FIG. 4 is a flowchart illustrating process 400 to perform an example method that facilitates object detection. For ease of illustration, process 400 may be described as being performed by a device or system described herein, such as vehicle 102 or the computing system 300. However, process 400 may be performed by other devices or a combination of devices and systems.

At operation 410, the system obtains reflective radar signals regarding a scene monitored by an array (e.g., array 106) of multiple antennas of a radar sensor system (e.g., system 104). In some implementations, the radar sensor system 104 transmits a sequence of short waveforms. For example, each waveform may be a chirp signal with a duration of one-hundred milliseconds (100 ms) and there may be one hundred twenty-eight of these waveforms that are transmitted consecutively in one radar frame in which the RI spectrum is determined.

Note that a particular array of multiple antennas of the radar sensor system is characterized by effecting a reflection-ghost offset of reflective intensity in one or more of the domains. That is, when reflective intensity in a specific domain (e.g., range, Doppler, and azimuth) is received by a particular antenna array, the reflection-ghost offset in that domain may be determined using techniques of which those of skill in the art are aware.

For example, a particular antenna array may be characterized as having an azimuth reflection-ghost offset in the azimuth domain. The azimuth offset is an angular distance between a main lobe of a spreading function and each ripple of its side lobes. Since the reflection-ghost offset of each ripple level is an emergent deterministic property of the particular radar sensor system, the reflection-ghost offset applies to the ripple levels of the spreading functions of each reflection peak.

At operation 420, the system determines the RI spectrum based on the reflective radar signals. The RI spectrum may contain three domains (i.e., dimensions) of reflective intensity with respect to reflection points and the radar sensor system. For example, the three domains of reflective intensity may include range, speed ("Doppler"), and azimuth. In some instances, the system reduces the RI spectrum, at operation 420, to two domains of reflective intensity (such as the range and azimuth domains). In some instances, the system may digitize (e.g., sample or pixelate) the RI spectrum. If so, then the remaining operations operate on the digitized RI spectrum.

At operation 430, the system produces a filtered RI spectrum by applying a trained convolutional neural network (CNN) to the RI spectrum by, at least in part, filtering the RI spectrum using one or more CNN kernels that incorporate the reflection-ghost offset. For example, the incorporation of the reflection-ghost offset with the CNN kernel includes setting the pattern of weights of a tensor of the CNN kernel to the domain distance of the reflection-ghost offset. The reflection-ghost offset is the domain (e.g., azimuth) distance between the main lobe weights in the tensor and each ripple of the side lobes. In this way, the CNN kernel can detect features (e.g., the side lobes) that may be widely spaced rather than local.

Since the domain distance of the reflection-ghost offset is an emergent characteristic of the antenna array, the relative locations of the side lobes are predictable. The CNN kernels of the trained CNN model are a tensor of weights with the predicable domain distance baked in. Thus, the weights in the tensor of the CNN kernel match the pattern of the main and side lobes of a spreading function.

At operation 440, the system analyzes the object detection candidates produced by the application of the CNN model. Based on this analysis, the system reports on detected objects to, for example, the perception system 324 of vehicle 102.

At operation 450, the system classifies the detected objects in the scene.

Figure 5:
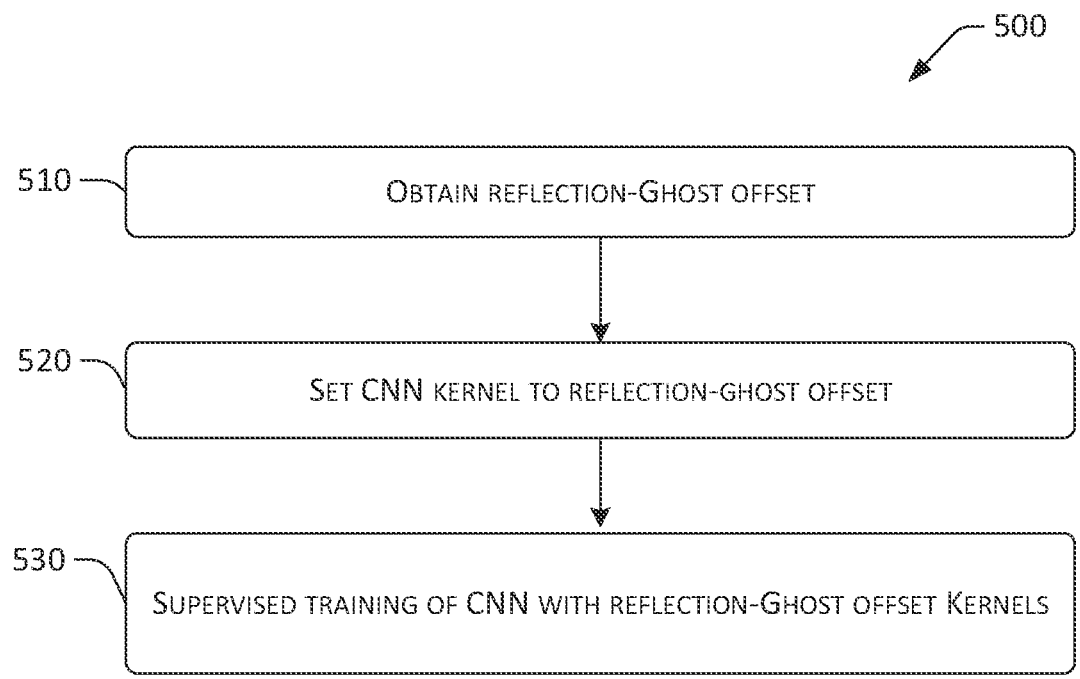
FIG. 5 is a flowchart illustrating a process to train a convolutional neural network (CNN) model using reflection-ghost offset kernels, in accordance with one or more implementations described herein.

FIG. 5 is a flowchart illustrating a process to train a convolutional neural network (CNN) model using reflection-ghost offset kernels, in accordance with one or more implementations described herein. For ease of illustration, process 500 may be described as being performed by a device or system described herein, such as vehicle 102 or the computing system 300. However, process 500 may be performed by other devices or a combination of devices and systems.

At operation 510, the system obtains one or more reflection-ghost offsets. The reflection-ghost offset is the domain (e.g., azimuth) distance between the main lobe and each ripple of the side lobes of a spreading function that characterizes a particular antenna array of a radar sensor system.

At operation 520, the system sets a CNN kernel to the reflection-ghost offset. The system sets the initial weights in the tensor of the CNN kernel to emphasize (e.g., positive weights) the main lobe while emphasizing (e.g., negative weights) the side lobes. The weights between the first and second coefficients are zero or otherwise negligible. In this way, the CNN kernel can detect features (e.g., the side lobes) that may be widely spaced rather than local. The setting of CNN kernels produces CNN kernels that are matched to the reflection-ghost offset.

In one or more instances, the training of the CNN kernel produces a tensor with a central and enhancing coefficient for the main lobe of the spreading function and side and de-emphasizing coefficients with a spacing from the central coefficient in the tensor that matches the ghost-reflection offset.

For example, the tensor of the CNN kernel is a hundred pixels wide. A central coefficient of the central pixel of the tensor is a first coefficient in order to emphasize the main lobe. In this example, the ghost-reflection offset is an angular distance of thirty-five pixels. Thus, at about thirty-five pixels on either side of the central coefficient in the tensor are a second coefficient where the reflection ghosts are anticipated. The second coefficient also emphasizes the reflection ghosts so that they are unlikely to cause false detection. The coefficients between the first and second coefficients are zero or otherwise negligible At operation 530, the system performs supervised training of an untrained CNN using a ground-truth RI spectrum with the CNN kernel with the reflection-ghost offset set therein. Since this domain distance is an emergent characteristic of the antenna array, the relative locations of the side lobes are predictable and do not change with each iteration of the supervised training of the CNN model. Instead, the iterative training adjusts the weights in the tensor to better match and identify the main and side lobes of a spreading function.

The system may train more than one CNN kernel. Also, each kernel may be set to more than one reflection-ghost offset. As mentioned above, each reflection-ghost offset is matched to a ripple of side lobes. Thus, for a kernel to detect multiple ripples, the kernel may be set to a reflection-ghost offset per ripple.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels and are not intended to impose numerical or positional requirements on their objects. As used herein, an element or step recited in the singular and preceded by the word "a" or "an" should be understood as not excluding the plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51% to 99% out of a possible extent of 100%", and do not necessarily mean "perfectly", "completely", "strictly", "entirely" or "100%". Additionally, the word "proximate" may be used herein to describe the location of an object or portion thereof concerning another object or portion thereof, and/or to describe the positional relationship of two objects or their respective portions thereof concerning each other, and may mean "near", "adjacent", "close to", "close by", "at" or the like. And, the phrase "approximately equal to" as used herein may mean one or more of "exactly equal to", "nearly equal to", "equal to somewhere between 90% and 110% of" or the like.

This written description uses examples, including the best mode, to enable those skilled in the art to make and use devices, systems, and compositions of matter, and to perform methods, according to this disclosure. It is the following claims, including equivalents, which define the scope of the present disclosure.

What is claimed is:

1. A method that facilitates object detection, the method comprising:
   obtaining reflective radar signals regarding a monitored scene, the reflective radar signals being received by an array of multiple antennas of a radar sensor system;
   determining a reflective-intensity (RI) spectrum based on the reflective radar signals, wherein the RI spectrum contains at least three domains of reflective intensity with respect to reflection points and the radar sensor system, the at least one of those domains of reflective intensity includes azimuth, and wherein the array of multiple antennas of the radar sensor system is characterized by effecting a reflection-ghost offset of reflective intensity in one or more of the domains;
   producing a filtered RI spectrum by applying a trained convolutional neural network (CNN) to the RI spectrum by, at least in part, filtering the RI spectrum using one or more CNN kernels that incorporate the reflection-ghost offset, wherein the one or more CNN kernels that incorporate the reflection-ghost offset is characterized as a tensor of values containing a first emphasizing value configured to emphasize a main lobe of a spreading function in one or more domains of the RI spectrum and a second emphasizing value to emphasize a side lobe of the spreading function, wherein a spacing in the tensor of values between the first and second emphasizing values matches the reflection-ghost offset; and
   detecting objects in the monitored scene based, at least in part, on the filtered RI spectrum.

2. A method of claim 1, wherein:
   the determining of the RI spectrum includes digitizing the RI spectrum; and
   the producing of the filtered RI spectrum operates on the digitized RI spectrum.

3. A method of claim 1, wherein the reflection-ghost offset is an azimuth offset in AN azimuth domain, which is an azimuth difference from a reflection point in the azimuth domain and its accompanying reflection ghost.

4. A method of claim 1, wherein the one or more CNN kernels is applied to a reduced RI spectrum, the method further comprises reducing the RI spectrum to two domains of reflective intensity, wherein the two domains include the range and azimuth.

5. A method of claim 1 further comprising:
   reporting detected objects to a perception system of a vehicle; and
   classifying the detected objects in the scene.

6. A method of claim 1 further comprising:
   obtaining the reflection-ghost offset;
   setting the one or more CNN kernels to the reflection-ghost offset; and
   supervised training an untrained CNN using a ground-truth RI spectrum with the one or more CNN kernels with the reflection-ghost offset set therein.

7. A device selected from a group consisting of a vehicle, an autonomous vehicle, a semi-autonomous vehicle, a video surveillance system, a medical imaging system, a video or image editing system, an object tracking system, a video or image search or retrieval system, and a weather forecasting system, the device being configured to perform the method of claim 1.

8. An object detection system comprising:
   a radar sensor system with an array of multiple antennas, wherein the array of multiple antennas is characterized by effecting a reflection-ghost offset of reflective intensity of signals received thereby in one or more domains of a reflective-intensity (RI) spectrum;
   a reflective-radar signal obtainer configured to obtain reflective radar signals regarding a scene monitored by the radar sensor system, the reflective radar signals being received by the array of multiple antennas;
   a RI spectrum determiner configured to determine a RI spectrum based on the reflective radar signals, wherein the RI spectrum contains at least three domains of reflective intensity with respect to reflection points and the radar sensor system, the at least one of those domains of reflective intensity includes azimuth;
a convolutional neural network (CNN) applier configured to produce a filtered RI spectrum by applying a trained CNN to the RI spectrum by, at least in part, filtering the RI spectrum using one or more CNN kernels that incorporate the reflection-ghost offset, wherein the one or more CNN kernels that incorporate the reflection-ghost offset is characterized as a tensor of values containing a first emphasizing value configured to emphasize a main lobe of a spreading function in one or more domains of the RI spectrum and a second emphasizing value to emphasize a side lobe of the spreading function, wherein a spacing in the tensor of values between the first and second emphasizing values matches the reflection-ghost offset; and
an object detector configured to detect objects in the monitored scene based, at least in part, on the filtered RI spectrum.

9. An object detection system of claim 8, wherein:
the RI spectrum determiner is further configured to digitize the RI spectrum; and
the CNN applier is further configured to operate on the digitized RI spectrum.

10. An object detection system of claim 8, wherein the reflection-ghost offset is an azimuth offset in the azimuth domain, which is an azimuth difference from a reflection point in the azimuth domain and its accompanying reflection ghost.

11. An object detection system of claim 8, wherein another of the domains of the RI spectrum includes range, Doppler, and elevation.

12. An object detection system of claim 8, wherein the one or more CNN kernels is applied to a reduced RI spectrum, the method further comprises reducing the RI spectrum to two domains of reflective intensity, wherein the two domains include the range and azimuth.

13. An object detection system of claim 8 further comprising:
a reporter configured to report detected objects to a perception system; and
a classifier configured to classify the detected objects in the scene.

14. An object detection system of claim 8 further comprising:
an offset obtainer configured to obtain the reflection-ghost offset and set the one or more CNN kernels to the reflection-ghost offset; and
a trainer configured to provide supervised training of an untrained CNN using a ground-truth RI spectrum with the one or more CNN kernels with the reflection-ghost offset set therein.

15. A device that includes the object detection system of claim 9, wherein the device is selected from a group consisting of a vehicle, an autonomous vehicle, a semi-autonomous vehicle, a video surveillance system, a medical imaging system, a video or image editing system, an object tracking system, a video or image search or retrieval system, and a weather forecasting system.

16. A non-transitory machine-readable storage medium encoded with instructions executable by one or more processors that, when executed, direct the one or more processors to perform operations that facilitate object detection, the operations comprising:
obtaining reflective radar signals regarding a monitored scene, the reflective radar signals being received by an array of multiple antennas of a radar sensor system;
determining a reflective-intensity (RI) spectrum based on the reflective radar signals, wherein the RI spectrum contains at least three domains of reflective intensity with respect to reflection points and the radar sensor system, the three domains of reflective intensity include range, Doppler, and azimuth, and wherein the array of multiple antennas of the radar sensor system is characterized by effecting a reflection-ghost offset of reflective intensity in one or more of the domains;
producing a filtered RI spectrum by applying a trained convolutional neural network (CNN) to the RI spectrum by, at least in part, filtering the RI spectrum using one or more CNN kernels that incorporate the reflection-ghost offset, wherein the one or more CNN kernels that incorporate the reflection-ghost offset is characterized as a tensor of values containing a first emphasizing value configured to emphasize a main lobe of a spreading function in one or more domains of the RI spectrum and a second emphasizing value to emphasize a side lobe of the spreading function, wherein a spacing in the tensor of values between the first and second emphasizing values matches the reflection-ghost offset; and
detecting objects in the monitored scene based, at least in part, on the filtered RI spectrum.

17. A non-transitory machine-readable storage medium of claim 16, wherein the one or more CNN kernels is applied to a reduced RI spectrum, the method further comprises reducing the RI spectrum to two domains of reflective intensity, wherein the two domains include the range and azimuth.

18. A non-transitory machine-readable storage medium of claim 16, wherein the operations further comprise:
obtaining the reflection-ghost offset;
setting the one or more CNN kernels to the reflection-ghost offset; and
supervised training an untrained CNN using a ground-truth RI spectrum with the one or more CNN kernels with the reflection-ghost offset set therein.

19. A non-transitory machine-readable storage medium of claim 16, wherein:
the determining of the RI spectrum includes digitizing the RI spectrum; and
the producing of the filtered RI spectrum operates on the digitized RI spectrum.

20. A non-transitory machine-readable storage medium of claim 16, wherein the reflection-ghost offset is an azimuth offset in an azimuth domain, which is an azimuth difference from a reflection point in the azimuth domain and its accompanying reflection ghost.

* * * * *